(12) United States Patent
Schmeling et al.

(10) Patent No.: US 12,380,467 B2
(45) Date of Patent: **\*Aug. 5, 2025**

(54) SALES PROMOTION USING PRODUCT COMPARISON

(71) Applicant: Transform SR Brands LLC, Hoffman Estates, IL (US)

(72) Inventors: Todd Schmeling, Gurnee, IL (US); Christie Rugh, Woodstock, IL (US); Gilead Fishel, Chicago, IL (US); Jonathan Burr, Willow Springs, IL (US)

(73) Assignee: TRANSFORM SR BRANDS LLC, Hoffman Estates, IL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/735,807

(22) Filed: Jun. 6, 2024

(65) Prior Publication Data

US 2024/0320709 A1    Sep. 26, 2024

Related U.S. Application Data

(63) Continuation of application No. 17/070,831, filed on Oct. 14, 2020, now Pat. No. 12,045,856, which is a continuation of application No. 14/750,507, filed on Jun. 25, 2015, now Pat. No. 10,846,742, which is a continuation of application No. 13/971,261, filed on Aug. 20, 2013, now abandoned.

(51) Int. Cl.
*G06Q 30/0601* (2023.01)
*G06Q 30/0251* (2023.01)

(52) U.S. Cl.
CPC ..... *G06Q 30/0253* (2013.01); *G06Q 30/0629* (2013.01); *G06Q 30/0631* (2013.01)

(58) Field of Classification Search
None
See application file for complete search history.

(56) References Cited

U.S. PATENT DOCUMENTS

| 6,026,375 A | 2/2000 | Hall et al. |
| 6,397,212 B1 | 5/2002 | Biffar |
| 6,880,750 B2 | 4/2005 | Pentel |
| 7,720,720 B1 | 5/2010 | Sharma et al. |

(Continued)

FOREIGN PATENT DOCUMENTS

| WO | 2004072762 | 8/2004 |
| WO | 2008014255 | 1/2008 |
| WO | 2011005072 | 1/2011 |

OTHER PUBLICATIONS

Q. Feng K. Hwang and Y. Dai, "Rainbow Product for Upgrading E-Commerce," in IEEE Internet Computing, vol. 13, No. 5, pp. 72-80, Sep.-Oct. 2009, doi: 10-1109/MIC.2009.113. (Year: 2009).*

(Continued)

*Primary Examiner* — Michelle T Kringen
(74) *Attorney, Agent, or Firm* — McAndrews, Held & Malloy, Ltd.

(57) ABSTRACT

Methods and apparatus are disclosed regarding an e-commerce system that promotes sales of products based on product comparisons. Some embodiments may present a marketing message that justifies a price difference between presented products based on attribute differences between the presented products.

20 Claims, 7 Drawing Sheets

(56) References Cited

U.S. PATENT DOCUMENTS

| | | |
|---|---|---|
| 8,200,550 B2 | 6/2012 | Altkins |
| 9,189,811 B1 | 11/2015 | Bhosle et al. |
| 2002/0065721 A1 | 5/2002 | Lema et al. |
| 2002/0111881 A1 | 8/2002 | Walker et al. |
| 2002/0143655 A1 | 10/2002 | Elston et al. |
| 2005/0004880 A1* | 1/2005 | Musgrove .......... G06Q 30/0253 |
| | | 705/400 |
| 2005/0273377 A1 | 12/2005 | Ouimet et al. |
| 2006/0076397 A1 | 4/2006 | Langos |
| 2006/0178943 A1 | 8/2006 | Rollinson et al. |
| 2007/0088624 A1 | 4/2007 | Vaughn et al. |
| 2007/0106468 A1 | 5/2007 | Eichenbaum et al. |
| 2007/0138268 A1 | 6/2007 | Tuchman |
| 2007/0257774 A1 | 11/2007 | Stumpert et al. |
| 2008/0228600 A1 | 9/2008 | Treyz et al. |
| 2008/0255925 A1 | 10/2008 | Vailaya et al. |
| 2009/0187488 A1 | 7/2009 | Shamilian |
| 2009/0198593 A1 | 8/2009 | Klug et al. |
| 2009/0281903 A1 | 11/2009 | Blatstein |
| 2010/0030619 A1* | 2/2010 | Ofer .................. G06Q 30/0605 |
| | | 705/26.1 |
| 2010/0088148 A1 | 4/2010 | Presswala et al. |
| 2010/0262477 A1 | 10/2010 | Hillerbrand et al. |
| 2010/0293106 A1 | 11/2010 | Rhoads et al. |
| 2011/0130129 A1 | 6/2011 | Snyder et al. |
| 2011/0196732 A1 | 8/2011 | Schueller et al. |
| 2011/0258058 A1 | 10/2011 | Carroll et al. |
| 2012/0005045 A1* | 1/2012 | Baker ................. G06F 3/04842 |
| | | 715/848 |
| 2012/0150681 A1 | 6/2012 | Yu et al. |
| 2012/0209710 A1 | 8/2012 | Ramer et al. |
| 2012/0296974 A1 | 11/2012 | Tabe |
| 2012/0330778 A1 | 12/2012 | Eastham |
| 2013/0096966 A1 | 4/2013 | Barnes, Jr. |
| 2013/0311335 A1 | 11/2013 | Howard et al. |
| 2014/0200965 A1 | 7/2014 | McConnell et al. |
| 2014/0279189 A1 | 9/2014 | Kubicki et al. |

OTHER PUBLICATIONS

Doorenbos, Robert B., Oren, Etzioni, and Daniel S. Weld. "A scalable comparison-shopping agent for the world-wide web." Agents. vol. 97.1997 (Year: 1997).

\* cited by examiner

Product Comparison

| Selected Product Designator 712₁ | Marketing Message 714₂ | Marketing Message 714_{M-1} | Marketing Message 714_M |
| Image 720₁ | Image 720₂ | Image 720_{M-1} | Image 720_M |
| Description 730₁ | Description 730₂ | Description 730_{M-1} | Description 730_M |
| Attribute 740₁ | Attribute 740₂ | Attribute 740_{M-1} | Attribute 740_M |
| Attribute 740₁ | Attribute 740₂ | Attribute 740_{M-1} | Attribute 740_M |
| ••• | ••• | ••• | ••• |
| Attribute 740₁ | Attribute 740₂ | Attribute 740_{M-1} | Attribute 740_M |
| 710₁ | 710₂ | 710_{M-1} | 710_M |

SALES PROMOTION USING PRODUCT COMPARISON

CROSS-REFERENCE TO RELATED APPLICATIONS

This application is a continuation of U.S. patent application Ser. No. 14/750,507, filed Jun. 25, 2015, which is a continuation of U.S. patent application Ser. No. 13/971,261, filed Aug. 20, 2013, the disclosures of which are hereby incorporated herein by reference in their entirety.

FIELD OF THE INVENTION

Various embodiments relate to electronic commerce (e-commerce), and more particularly, to promoting the sale of products in an e-commerce environment.

BACKGROUND OF THE INVENTION

Electronic commerce (e-commerce) websites are an increasingly popular venue for consumers to research and purchase products without physically visiting a conventional brick-and-mortar retail store. An e-commerce website may provide a much greater selection of products than is typically feasible via a conventional brick-and-mortar store. The e-commerce website may also provide a wealth of information regarding each offered product. Thus, e-commerce websites may offer a vast array of products for sale and may provide a vast amount of data about each product. While such product selection and information may provide consumers with the tools needed to make an informed purchase, there are a substantial number of consumers that find such a vast selection of products and associated information overwhelming and confusing. Such consumers may welcome guidance as to which products may satisfy their needs as well as guidance as to why they may desire to select one product over another product.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Apparatus and methods of promoting the sale of products in an e-commerce environment are substantially shown in and/or described in connection with at least one of the figures, and are set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 7 shows details of an embodiment of a product comparison that may be generated by the e-commerce system of FIG. 1

DETAILED DESCRIPTION OF THE INVENTION

Aspects of the present invention are related to an e-commerce environment that permits and/or supports the sale of products via computing and/or communication devices. More specifically, certain embodiments of the present invention relate to apparatus, hardware and/or software systems, and associated methods that provide consumers with a selection of products having different attributes and prices as well as guidance as to why one may select one product over another of the selection of products.

Figure 1:
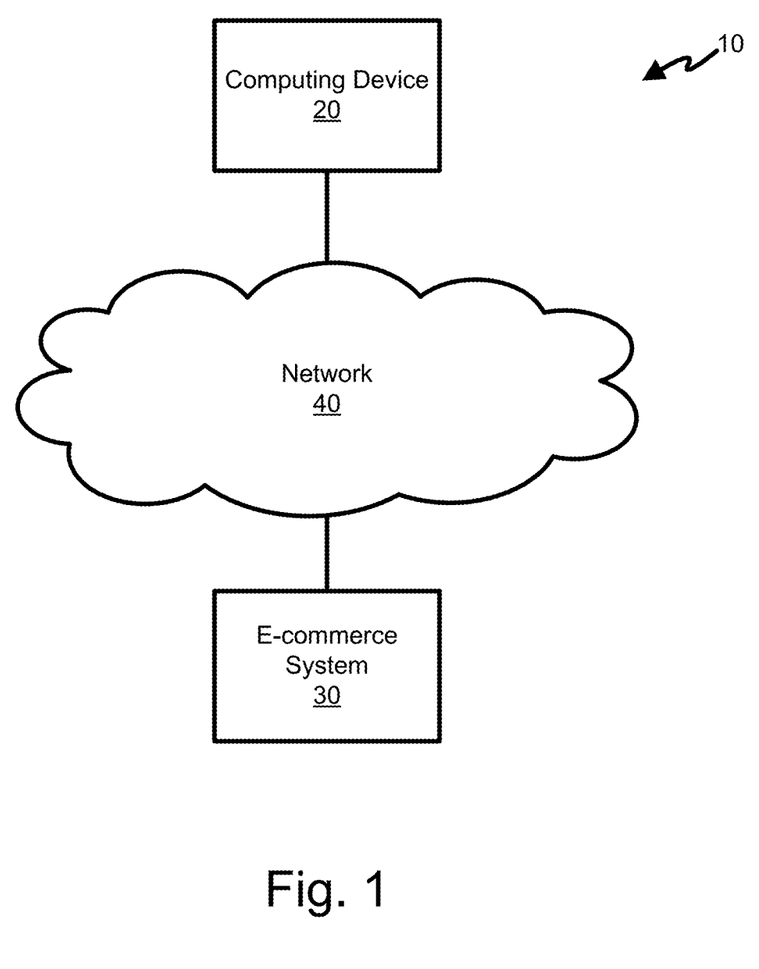
FIG. 1 shows an e-commerce environment comprising a computing device and an e-commerce system in accordance with an embodiment of the present invention.

Referring now to FIG. 1, an e-commerce environment 10 is depicted. As shown, the e-commerce environment 10 may include a computing device 20 connected to an e-commerce system 30 via a network 40. The network 40 may include a number of private and/or public networks such as, for example, wireless and/or wired LAN networks, cellular networks, and the Internet that collectively provide a communication path and/or paths between the computing device 20 and the e-commerce system 30. The computing device 20 may include a desktop, a laptop, a tablet, a smart phone, and/or some other type of computing device which enables a user to communicate with the e-commerce system 30 via the network 40. The e-commerce system 30 may include one or more web servers, database servers, routers, load balancers, and/or other computing and/or networking devices that operate to provide an e-commerce experience for users that connect to the e-commerce system 30 via the computing device 20 and the network 40.

FIG. 1 depicts a simplified embodiment of the e-commerce environment 10 which may be implemented in numerous different manners using a wide range of different computing devices, platforms, networks, etc. Moreover, while aspects of the e-commerce environment 10 may be implemented using a client/server architecture, aspects of the e-commerce may be implemented using a peer-to-peer architecture or another networking architecture.

Figure 2:
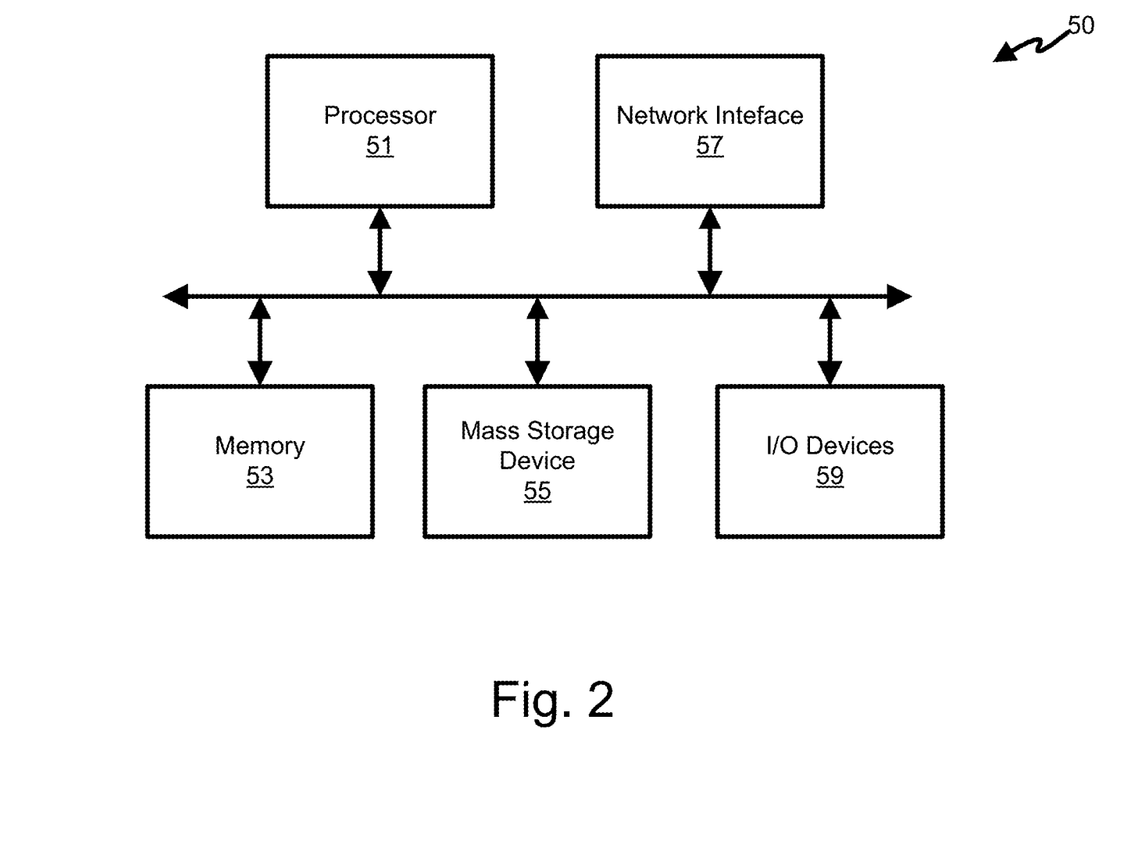
FIG. 2 shows an embodiment of a computing device for use in the e-commerce environment of FIG. 1.

As noted above, the e-commerce system 30 may include one or more computing devices. FIG. 2 depicts an embodiment of a computing device 50 suitable for the computing device 20 and/or the e-commerce system 30. As shown, the computing device 50 may include a processor 51, a memory 53, a mass storage device 55, a network interface 57, and various input/output (I/O) devices 59. The processor 51 may be configured to execute instructions, manipulate data and generally control operation of other components of the computing device 50 as a result of its execution. To this end, the processor 51 may include a general purpose processor such as an x86 processor or an ARM processor which are available from various vendors. However, the processor 51 may also be implemented using an application specific processor and/or other logic circuitry.

The memory 53 may store instructions and/or data to be executed and/or otherwise accessed by the processor 51. In some embodiments, the memory 53 may be completely and/or partially integrated with the processor 51.

In general, the mass storage device 55 may store software and/or firmware instructions which may be loaded in memory 53 and executed by processor 51. The mass storage device 55 may further store various types of data which the processor 51 may access, modify, and/otherwise manipulate in response to executing instructions from memory 53. To this end, the mass storage device 55 may comprise one or more redundant array of independent disks (RAID) devices, traditional hard disk drives (HDD), solid-state device (SSD) drives, flash memory devices, read only memory (ROM) devices, etc.

The network interface 57 may enable the computing device 50 to communicate with other computing devices directly and/or via network 40. To this end, the networking interface 57 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc), and/or some other type of networking interface capable of providing a communications link between the computing device 50 and network 40 and/or another computing device.

Finally, the I/O devices 59 may generally provide devices which enable a user to interact with the computing device 50 by either receiving information from the computing device 50 and/or providing information to the computing device 50. For example, the I/O devices 59 may include display screens, keyboards, mice, touch screens, microphones, audio speakers, etc.

While the above provides general aspects of a computing device 50, those skilled in the art readily appreciate that there may be significant variation in actual implementations of a computing device. For example, a smart phone implementation of a computing device may use vastly different components and may have a vastly different architecture than a database server implementation of a computing device. However, despite such differences, computing devices generally include processors that execute software and/or firmware instructions in order to implement various functionality. As such, the above described aspects of the computing device 50 are not presented from a limiting standpoint but from a generally illustrative standpoint. Aspects of the present application may find utility across a vast array of different computing devices and the intention is not to limit the scope of the present application to a specific computing device and/or computing platform beyond any such limits that may be found in the appended claims.

Figure 3:
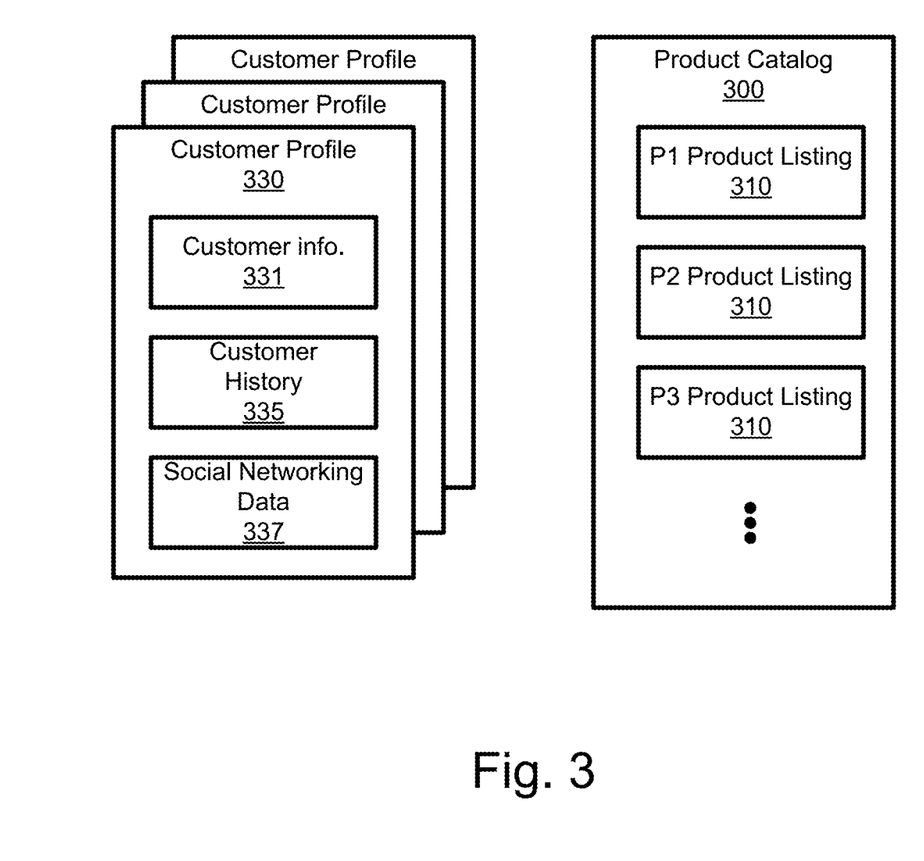
FIG. 3 shows user profiles and product catalogs maintained by an e-commerce system of FIG. 1.

As part of the provided e-commerce experience, the e-commerce system 30 may enable customers, which may be guests or members of the e-commerce system 30, to browse and/or otherwise locate products. The e-commerce system 30 may further enable such customers to purchase products offered for sale. To this end, the e-commerce system 30 may maintain an electronic product database or product catalog 300 which may be stored on an associated mass storage device 55. As shown in FIG. 3, the product catalog 300 includes product listings 310 for each product available for purchase. Each product listing 310 may include various information or attributes regarding the respective product, such as a unique product identifier (e.g., stock-keeping unit "SKU"), a product description, product image(s), manufacture information, available quantity, price, product features, etc. Moreover, while the e-commerce system 30 may enable guests to purchase products without registering and/or otherwise signing-up for a membership, the e-commerce system 30 may provide additional and/or enhanced functionality to those users that become a member.

To this end, the e-commerce system 30 may enable members to create a customer profile 330. As shown, a customer profile 330 may include personal information 331, customer history 335, and social networking data 337. The personal information 331 may include such items as name, mailing address, email address, phone number, billing information, clothing sizes, birthdates of friends and family, etc. The customer history 335 may include information regarding prior customer activities such as products previously researched and/or purchased from the e-commerce system 30. The customer history 335 may further include similar activities associated with affiliated online and brick-and-mortar vendors. Such information provided by the customer history 335 may provide insight into products and/or types of products that may interest the customer. The e-commerce system 30 may further enable a member to enter and/or authorize access to social networking data 337. For example, the e-commerce system 30 may permit a member to identify another member as a friend, buddy, co-worker, family member, or some other designation. The e-commerce system 30 may utilize such relationship designations 339 to provide further insight into which products and/or types of products may interest the customer.

Figure 4:
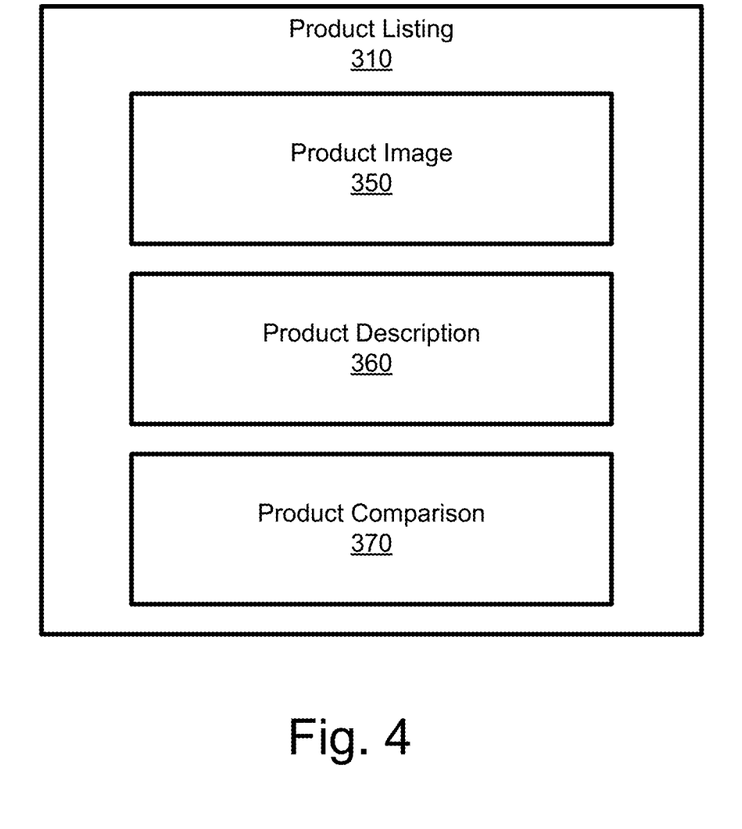
FIG. 4 shows an embodiment of a product listing provided by the e-commerce system of FIG. 1.

As part of the e-commerce experience, the e-commerce system 30 may cause a computing device 20 to display a product listing 310 as shown in FIG. 4. In particular, the e-commerce system 30 may provide such a product listing 310 in response to a member browsing products by type, price, kind, etc., viewing a list of products obtained from a product search, and/or other techniques supported by the e-commerce system 30 for locating products of interest. As shown, the product listing 310 may include one or more representative images 350 of the product as well as a product description 360. The product listing 310 may further include a product comparison 370 that presents one or more products as alternatives to an identified or otherwise selected product.

As noted above, the e-commerce system 30 may permit a consumer to select from a vast array of products. A customer may be overwhelmed by such a vast array of products. Moreover, a customer may wonder if a "better" product for their needs is available than the currently selected product. However, "better" may mean different things to different customers. Some customers may prefer a less expensive product. Other customers may prefer to spend more in order to obtain a product with additional features and/or upgraded features.

In light of such customer behavior, the e-commerce system 30 may utilize emergent data analysis techniques in an attempt to identify "better" product alternatives for the customer and present the customer with a selection of product alternatives which the customer may deem "better" than the currently selected product. U.S. application Ser. No. 12/755,702 of Hillerbrand et al., entitled "Online Social Networking System For Conducting Commerce" and filed Apr. 7, 2010, the disclosure of which is hereby incorporated by reference, describes emergent data analysis techniques that may be used by the e-commerce system 30 to identify alternative products which a customer may find to be "better" than the currently selected product.

Figure 5:
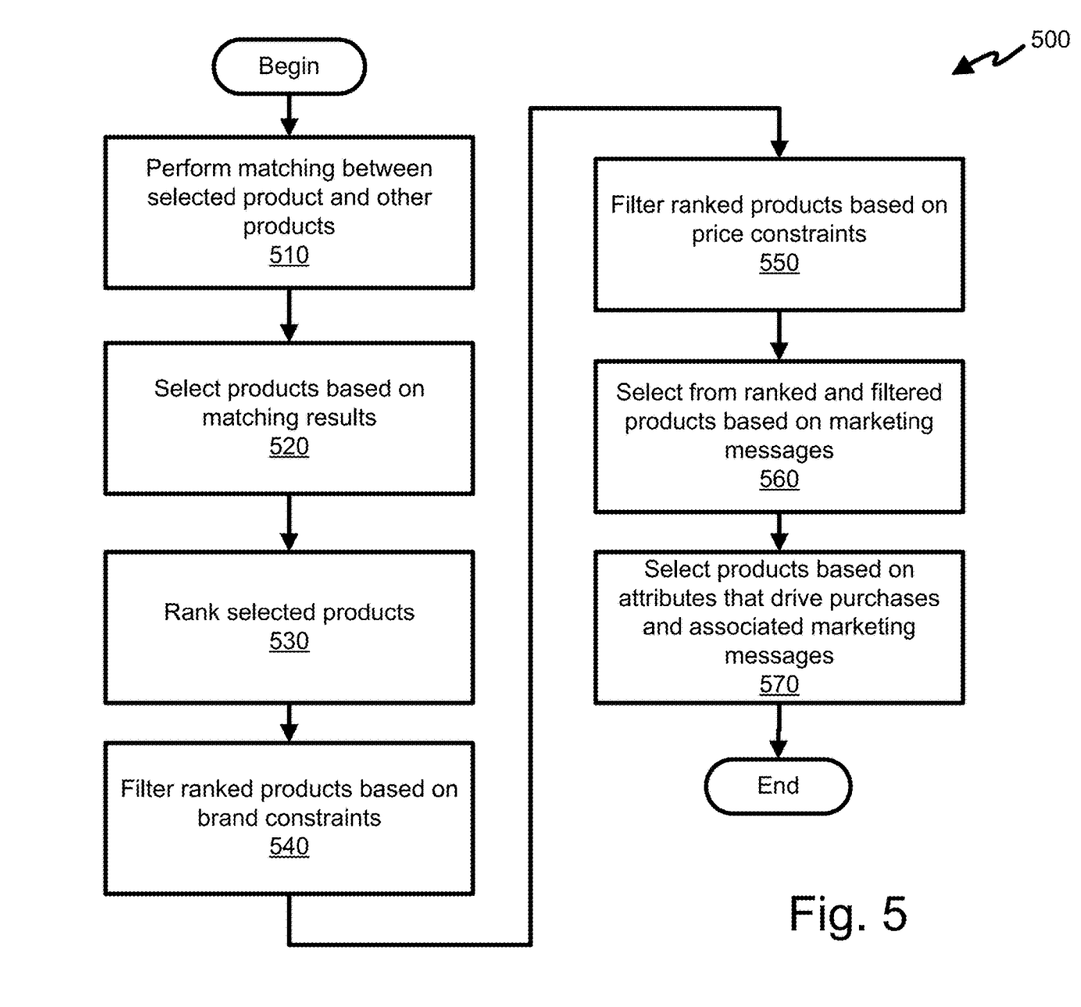
FIG. 5 shows a flowchart for an embodiment of a method that may be used by the e-commerce system of FIG. 1 to rank, select, and/or identify similar products.

Referring now to FIG. 5, a method 500 that may be used by the e-commerce system 30 to identify alternative products for a selected product is shown. The selection of alternative products, however, may be accomplished using a variety of different processes. At 510, the e-commerce system 30 may perform various types of matching of the selected product to products in the product database 300. Such matching may be performed in response to a customer selecting a product, but may also be predetermined and stored in a database such as product database 300 for quicker retrieval and presentation to the customer. In one embodiment, the e-commerce system 30 matches the selected product to other products of the product database 300 using 9 different types or levels of matching. In particular, the e-commerce system 30 matches the selected product to products in the product database 300 uses the following matching types:

Exact: identifies products in the database 300 that are the same or extremely close to the selected product;

Auto: identifies products in the database 300 that are very similar and that are considered to be within the same assortment as the selected product;

Track: identifies products in the database 300 that are similar in content and price, but not as closely matched to the selected product as Auto;

Match: identifies products in the database 300 that are similar but have a significantly different price than the selected product (e.g., price greater than 105% of the selected product);

View track: identifies products in the database 300 that are related in content and price to the selected product;

View: identifies products in the database 300 that are related in content but not price to the selected product;

Search track: identifies products in the database 300 that are loosely connected in content and price to the selected product;

Search: identifies products in the database 300 that are loosely connected in content but not price to the selected product; and None: identifies products in the database 300 that have no measurable content intersections of value to the selected product.

After determining the type of match, the e-commerce system 30 at 520 may select the products that were identified as satisfying an exact, auto, track, and match type for further consideration of alternative products for the selected product. As a result of such selection, the e-commerce system 30 may cease further consideration of those products that do not satisfy one of such predetermined match types.

At 530, the e-commerce system 30 may further rank the selected products based on the overall percentage of match within the match type. In particular, the e-commerce system 30 may perform such a ranking based on the many attributes of each product which are stored in the database 300 such as product category, product type, size, colors, brands, gender, dimensions, speed, technical features, etc. Based on such overall percentage of match, the e-commerce system 30 may rank each product from highest percentage match to lowest percentage match. In ranking the products, the e-commerce system 30 may also account for business, logistics, and/or other attributes for each product that are not technically attributes or features of the product itself but attributes of the product in light of the e-commerce system 30. In particular, the e-commerce system 30 may influence the ranking of a product based on current stock levels of the product, shipping times for the product, shipping costs associated with the product, profit margin of the product, and/or other attributes of the product that may effect profitability and/or logistics of the e-commerce system 30 as a result of selling the product.

The e-commerce system 30 at 540 may filter the ranked products based and brand constraints. For example, the e-commerce system 30 may utilize a brand constraint to provide a customer looking at a particular Kenmore® dishwasher with other Kenmore® dishwashers from which to choose. Conversely, the e-commerce system 30 may elect to forgo any brand constraint and provide a customer looking at a particular Samsung® television with other alternative televisions which may or may not also be the Samsung® televisions. The e-commerce system 30 may support a number of different manners for determining whether to utilize a brand constraint. In particular, the e-commerce system 30 may provide a site manager or other person associate with the e-commerce system 30 with various ways to define whether a brand constraint should be used for a particular product. For example, the site manager may indicate whether the system is to use a brand constraint on a product by product basis, for a category of products, for certain product brands, and/or whether such a brand constraint is to be dynamically determined based upon the product ranking.

The e-commerce system 30 at 550 may further filter the ranked products based on pricing constraints. For example, the e-commerce system 30 may select top ranked products that have a selling price greater than a threshold percentage (e.g. 105%) of the selling price of the selected product. Likewise, the e-commerce system 30 may select top ranked products that have a selling price less than a threshold percentage (e.g. 105%) of the selling price of the selected product. In one embodiment, the matching types and subsequent ranking effectively preclude drastic price differences between the top ranked products and the selected product (e.g., a price that is greater than 200% of the selected product).

At 560, the e-commerce system 30 may select products based on marketing messages for such products. In particular, the e-commerce system 30 may further identify attribute differences between top ranked alternative products and the selected product and determine whether the database 300 has a marketing message tied to such differences and/or whether a dynamically generated marketing message may be constructed from such differences. In one embodiment, the e-commerce system 30 may provide a site manager and/or other persons associated with the e-commerce system 30 various tools for ranking product attributes in relation to customer purchasing behavior as well as providing marketing messages tied to such attributes. The provided tools may also permit the site manager to specify marketing messages for the ranked product attributes.

In general, the marketing messages justify a purchase choice based on the associated attribute difference between products. In addition to providing tools that enable a site manager to manually rank product attributes and specify associated marketing messages, the e-commerce system 30 may also dynamically identify product attributes that appear to drive purchase decisions based upon the customer's history 335 and the histories 335 of other customers. The e-commerce system 30 may further weight the histories 335 of customers with a relationship to the current customer based on the social networking data 337.

The e-commerce system 30 at 570 may then make the final selection of product alternatives to present to the customer based upon the ranking of product attributes that drive purchase decisions and marketing messages tied to such attributes. Thus, the e-commerce system 30 via method 500 and/or other data analysis techniques may attempt to identify products in the product catalog 300 that are similar to the selected product, but have a selling price that is greater than a threshold percentage (e.g., 105%) of the selling price of the selected product and/or less than a threshold percentage (e.g., 105%) of the selling price of the selected product. The e-commerce system 30 may then present such alternative products to the customer via a product comparison 370 that provides the customer with a relatively small sample (e.g., 2, 3, or 4) of alternative products similar to the selected product. Moreover, the e-commerce system 30 via the product comparison 370 may further provide the customer with marketing messages that aid the customer in determining whether one of the alternative products may be a "better" purchase.

Figure 6:
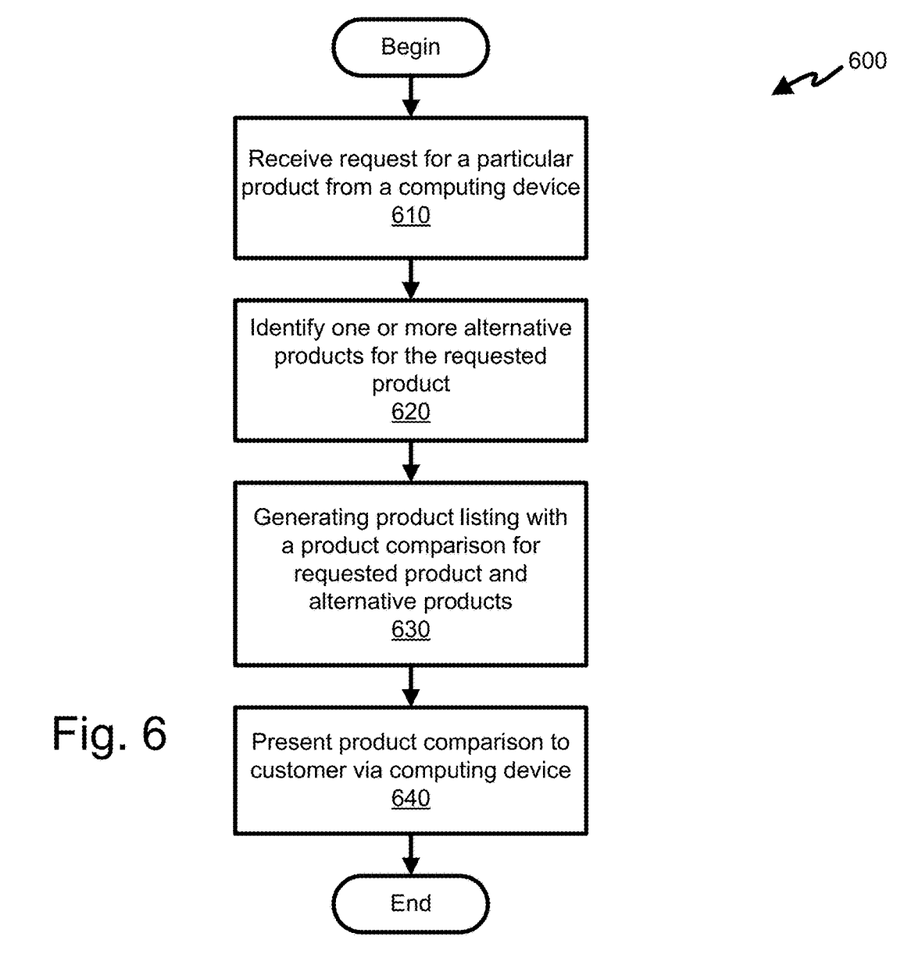
FIG. 6 shows a flowchart for an embodiment of a method that may be used by the e-commerce system of FIG. 1 to generate a product comparison between similar products.

To better understand the product comparison 370 and the process of providing a customer with the product comparison 370, reference is now made to FIG. 6. FIG. 6 depicts an embodiment of a method 600 which may be used by the e-commerce system 30 to generate the product comparison 370 and provide such product comparison 370 to a customer via a computing device 20.

The e-commerce system 30 at 610 may receive a request for a particular product from a computing device 20. The computing device 20 may generate and the e-commerce system 30 may receive such a request as a result of various actions taken by a customer using the computing device 20. For example, the computing device 20 may generate the request in response to the customer selecting the product from various lists and/or other presentations of products provided by the e-commerce system 30 and presented to the customer via the computing device 20. In particular, the computing device 20 may present the customer with a list of products in response to the customer browsing products, searching for products, viewing a personalized page comprising product listings for recommended products, etc. The computing device 20 may then generate the request in response to the customer selecting one of the products from the presented list.

In response to the request, the e-commerce system 30 at 620 may identifying one or more alternative products to the product identified in the received request. In particular, the e-commerce system 30 may identify such alternative products using emergent data analysis techniques in a manner similar to that present in FIG. 5. In particular, the e-commerce system 30 may identify products that are similar to the selected product, that have at least one attribute that is different than the selected product, and that have a different selling price than the selling price of the selected product.

At 630, the e-commerce system 30 may generate a product listing 310 for the selected product that includes a product comparison 370. In particular, the e-commerce system 30 may select a relatively small number (e.g. less than 4) of alternative products, from a ranking of products, for inclusion in the product comparison. In some embodiments, a site manager or another person associated with the e-commerce system 30 may manually specify the relatively small number (e.g., less than 4) of alternative products to be displayed on a product by product basis, on a product category basis, on a brand basis, and/or on some other basis. Furthermore, the e-commerce system 30 may further support dynamically determining the relatively small number based on the ranking process of FIG. 5 and/or other data analysis techniques. Regardless, the e-commerce system 30 may select products for which the e-commerce system 30 either (i) has a predefined marketing message to justify a price difference between the alternative product and the selected product, or (ii) is able to dynamically generate a marketing message to justify the price difference. Moreover, the e-commerce system 30 may generate the product comparison 370 such that the product comparison 370 lists only a few key attributes of each of the products in the product comparison 370 and in particular the attribute or attributes upon which the marketing message or messages rely.

As noted above, the product catalog 300 may include a vast number of attributes for each product. The e-commerce system 30 may generate the product listing 310 in a manner that includes only a few key attributes in the product comparison 370 so as to not overwhelm the customer with information. However, the e-commerce system 30 may also provide the product listing 310 with links and/or other mechanisms that permit the customer to obtain information for additional attributes about one or more of the listed products. The key attributes may be either manually specified and/or ranked by a site manager or another person associated with the e-commerce system 30. Moreover, in some embodiments, the e-commerce system 30 may dynamically determine key attributes and/or select a subset of manually ranked attributes based on customer histories 335, social networking data 337, and/or the product selection/ranking process of FIG. 5.

The e-commerce system 30 at 640 may present the product listing 310 including product comparison 370 to the customer. In particular, the e-commerce system 30 may transfer, via the network 40, the product listing 310 including the product comparison 370 to the computing device 20 from which the request was received at 610. The computing device 20 may then present the listing 310 and comparison 370 to the customer via a video display or another output device of the computing device 20.

A more detailed view of one embodiment of the product comparison 370 is shown in FIG. 7. As shown, the product comparison 370 may include a column $710_1$, $710_2$ ... $710_{M-1}$, $710_M$ for each product in the comparison 370. The placement of products in columns $710_1$, $710_2$ ... $710_{M-1}$, $710_M$ may differ from that depicted. For example, in one embodiment, the e-commerce system 30 may generate the comparison 370 such that the selling price of products increases from left to right. In such an embodiment, if the selected product is the least expensive, then the e-commerce system 30 places the selected product in the left most column $710_1$. Conversely, if the selected product is the most expensive product, then the e-commerce system 30 places the selected product in the right most column $710_M$. Moreover, if the selected product is neither the most expensive nor least expensive product, then e-commerce system 30 places the selected product in the appropriate central column $701_2$, $701_3$ ... $701_{M-1}$.

As shown, the comparison 370 may further include a selected product designator $712_1$ that identifies the respective column as belonging to the selected product of the product listing 310. For example, the selected product designator $712_1$ may comprise an appropriate textual label such as "Selected Product" or "Current Product." The selected product designator $712_1$ may also include other visual clues such as icons, color schemes, etc. which signal to the customer that the information found in the respective column corresponds to the product of the product listing 310.

Each column $710_1$, $710_2$ ... $710_{M-1}$, $710_M$ may further include a product image $720_1$, $720_2$ ... $720_{M-1}$, $720_M$ and a product description $730_1$, $730_2$ ... $730_{M-1}$, $730_M$ for its respective product. In particular, each product image $720_1$, $720_2$ ... $720_{M-1}$, $720_M$ may provide a representative image of its corresponding product such as a photographic image of the product itself, a photographic image of the product in its packaging, or another image from which the consumer may readily identify as being the particular product. Furthermore, each product description $730_1$, $730_2$ ... $730_{M-1}$, $730_M$ may provide some basic identifying information for the respective product such as product type, brand, price, or other information of a general nature. For example, if the comparison 370 is of high definition televisions, the product description of a particular product may be "Samsung 60" Class 1080p 120 Hz Slim 3D LED HDTV for $1699.99" For a comparison 370 of riding lawn mowers, the product description of a particular product may be "Craftsman 26 HP V-Twin 50" Zero-Turn Riding Mower for $2564.99." It should be appreciated that the level of detail provided in the product descriptions $730_1$, $730_2$ ... $730_{M-1}$, $730_M$ may vary among embodiments.

Each column $710_1$, $710_2$ ... $710_{M-1}$, $710_M$ may further include a relatively small number of product attributes $740_1$, $740_2$, ... $740_{M-1}$, $740_M$ for its respective product. In particular, the e-commerce system 30 may select key product attributes as discussed above and in particular product attributes which are tied to the marketing message $714_2$ ... $714_{M-1}$, $714_M$. For example, a product comparison 370 of televisions may include the following attributes: 3D and respective value such as Yes or No; Diagonal Screen Size and respective value such as 60", 64", etc.; Refresh Rate and respective value such as 120 Hz, 600 Hz, etc.; Resolution and respective value such as 1080p; and Technology and respective value such as LED, Plasma, etc. For a comparison 370 of riding lawn mowers, the selected key attributes may include: Horsepower and respective value such as 24 hp Briggs & Stratton Platinum, 26 hp Briggs & Stratton Platinum, 24 hp Kohler Courage; Deck Cut Width and respective value such as 42", 50", 54", etc.; Turning Radius and respective value such as Zero, 1 foot, etc.; Transmission Type and respective value such as Dual Hydrostatic Automatic and Premium Dual Hydrostatic; and Cylinders and respective value such as 2, 4, etc.

Finally, the comparison 370 for each alternative product may include a marketing message $714_2$ ... $714_{M-1}$, $714_M$ that attempts to justify a price difference between the selected product and the respective product. Ideally, the marketing message $714_2$ ... $714_{M-1}$, $714_M$ is tied to one or more of the product attributes $740_1$, $740_2$, ... $740_{M-1}$, $740_M$ that differ between the respective products. For example, a comparison 370 of televisions may include marketing messages of "Go 3D!" or "Bigger Screen." Marketing messages for riding mowers may include "For $380 get a larger engine and a wider cutting width" or "For $665 get a wider cutting width and a more powerful transmission."

In this manner, the product comparison 370 may quickly highlight differences between products and provide a quick marketing message $714_2$ ... $714_{M-1}$, $714_M$ as to why one may select one product over another product. Such product comparisons 370 may therefore help customers to make a more informed purchasing decision. Furthermore, besides helping customers make more informed purchasing decisions, the comparisons 370 may also improve a customer's opinion of the shopping experience provided by the e-commerce environment 10. In particular, customers may appreciate not being inundated with product details and may also appreciate being provided with a small selection of relevant product alternatives and a short marking messages as to why they may want to select one of the alternative products.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a non-transitory, computer readable storage medium such as, for example, flash memory devices, hard disk devices, compact disc media, DVD media, EEPROMs, etc. Such instructions, when executed by one or more computing devices, may result in the one or more computing devices promoting the sale of products and/or one or more of the other aspects of the e-commerce environment 10 described above.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:
1. A method, the method comprising:
via a first computing device:
receiving a request from a customer via a second computing device configured to be operated by the customer, wherein the request identifies a requested product from a product database;
identifying relationships between the customer and other customers of the e-commerce system based on social networking data obtained for the customer;
weighting purchase histories for the other customers of the e-commerce system based on the identified relationships;
identifying purchase-driving attributes of the requested product, based on a purchase history for the customer and the weighted purchase histories for the other customers;
ranking products of the product database;
selecting, based on its ranking, an alternative product that has a marketing message that provides a justification of a price difference between a selling price of the requested product and a selling price of the alternative product;
generating a presentation of a comparison of the requested product and the alternative product; and
automatically initiating, by one or more processors of the first computing device, a transmission of the presentation of the comparison and the marketing message to the customer via a cellular network interface according to at least one predetermined condition, wherein the transmission is configured to optimize delivery timing to enhance user engagement; and
via the second computing device, displaying the presentation of the comparison.
2. The method of claim 1, wherein the selling price of the alternative product is higher than the selling price of the requested product.
3. The method of claim 1, wherein the selling price of the alternative product is lower than the selling price of the requested product.

4. The method of claim 1, wherein:
the requested product and the alternative product differ by only a single attribute of the one or more of the purchase-driving attributes in the comparison; and
the justification provided by the marking message is based on the single attribute.

5. The method of claim 1, wherein:
the requested product and the alternative product differ by at least two attributes of the one or more of the purchase-driving attributes in the comparison; and
the justification provided by the marking message is based on the at least two attributes.

6. The method of claim 1, wherein ranking products of the product database comprises:
comparing the purchase-driving attributes of the requested product to corresponding attributes of products stored in the product database; and
ranking at least a subset of the products stored in the product database based upon said comparing.

7. The method of claim 1, further comprising accessing the social networking data for the customer from a customer profile for the customer.

8. The method of claim 1, wherein identifying the purchase-driving attributes of the requested product comprises dynamically selecting the purchase-driving attributes from a manually-ranked list of attributes.

9. An e-commerce system, comprising:
a first computing device, operably coupled to a network interface via a cellular protocol, configured to receive a request from a customer via a second computing device configured to be operated by the customer, wherein the request identifies a requested product from a product database; and
a first processor, of the first computing device, configured to:
identify relationships between the customer and other customers of the e-commerce system based on social networking data obtained for the customer;
weight purchase histories for the other customers of the e-commerce system based on the identified relationships;
identify purchase-driving attributes of the requested product, based on a purchase history for the customer and the weighted purchase histories for the other customers;
rank products of the product database, based at least upon matching attributes of each product to corresponding attributes of the purchase-driving attributes for the requested product;
identify a plurality of alternative products from the product database, based on a predetermined match, stored in the product database, between the requested product and the plurality of alternative products;
identify a second plurality of attributes according to the purchase histories that are weighted per relationships identified in the social networking data;
select, based on its ranking, an alternative product that has a marketing message that provides a justification of a price difference between a selling price of the requested product and a selling price of the alternative product;
generate a presentation of a comparison of the requested product and the alternative product; and
automatically initiate, by one or more processors of the first computing device, a transmission of the comparison and the marketing message that attempts to justify the price difference to the second computing device for presentation to the customer, wherein:
the transmission is initiated according to at least one predetermined condition,
the transmission is configured to optimize delivery timing to enhance user engagement, and
the presentation of the comparison is displayed via a second processor of the second computing device.

10. The e-commerce system of claim 9, wherein the selling price of the alternative product is higher than the selling price of the requested product.

11. The e-commerce system of claim 9, wherein the selling price of the alternative product is lower than the selling price of the requested product.

12. The e-commerce system of claim 9, wherein:
the requested product and the alternative product differ by only a single attribute of the one or more of the purchase-driving attributes in the comparison; and
the justification provided by the marking message is based on the single attribute.

13. The e-commerce system of claim 9, wherein:
the requested product and the alternative product differ by at least two attributes of the one or more of the purchase-driving attributes in the comparison; and
the justification provided by the marking message is based on the at least two attributes.

14. The e-commerce system of claim 9, wherein the first processor is configured to rank products of the product database by:
comparing the purchase-driving attributes of the requested product to corresponding attributes of products stored in the product database; and
ranking at least a subset of the products stored in the product database based upon said comparing.

15. The e-commerce system of claim 9, wherein the first processor is configured to access the social networking data for the customer from a customer profile for the customer.

16. The e-commerce system of claim 9, wherein the first processor is configured to identify the purchase-driving attributes of the requested product by dynamically selecting the purchase-driving attributes from a manually-ranked list of attributes.

17. A non-transitory computer readable medium comprising instructions, wherein an execution of the instructions cause a first computing device, in response to a request from a second computing device, to at least:
identify relationships between a customer, operating the second computing device, and other customers of the e-commerce system based on social networking data obtained for the customer;
weight purchase histories for the other customers of the e-commerce system based on the identified relationships;
identify purchase-driving attributes of a requested product, based on a purchase history for the customer and the weighted purchase histories for the other customers;
rank products of a product database, based at least upon matching attributes of each product to corresponding attributes of the purchase-driving attributes for the requested product;
identify a plurality of alternative products from the product database, based on a predetermined match, stored in the product database, between the requested product and the plurality of alternative products;
identify a second plurality of attributes according to the purchase histories that are weighted per relationships identified in the social networking data;

select, based on its ranking, an alternative product that has a marketing message that provides a justification of a price difference between a selling price of the requested product and a selling price of the alternative product;

generate a comparison of the requested product and the alternative product; and automatically initiate, by one or more processors of the first computing device, a transmission of the comparison and the marketing message that attempts to justify the price difference to the second computing device for presentation to the customer, wherein the transmission is initiated according to at least one predetermined condition to optimize delivery timing and enhance user engagement; and display the presentation of the comparison via the second computing device.

18. The non-transitory computer readable medium of claim 17, wherein:

the requested product and the alternative product differ by only a single attribute of the one or more of the purchase-driving attributes in the comparison; and execution of the instructions further causes the e-commerce system to generate, based on the single attribute, the justification provided by the marking message.

19. The non-transitory computer readable medium of claim 17, wherein:

the requested product and the alternative product differ by at least two attributes of the one or more of the purchase-driving attributes in the comparison; and execution of the instructions further causes the e-commerce system to generate, is based on the at least two attributes, the justification provided by the marking message.

20. The non-transitory computer readable medium of claim 17, wherein execution of the instructions further causes the e-commerce system to rank products of the product database by:

comparing the purchase-driving attributes of the requested product to corresponding attributes of products stored in the product database; and ranking at least a subset of the products of the product database based upon said comparing.

* * * * *